(12) United States Patent
Hayashi et al.

(10) Patent No.: US 9,138,736 B2
(45) Date of Patent: Sep. 22, 2015

(54) EXHAUST PURIFYING CATALYST

(75) Inventors: Kotaro Hayashi, Mishima (JP); Satoshi Nagao, Gotenba (JP); Hideaki Suzuki, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 225 days.

(21) Appl. No.: 13/637,798

(22) PCT Filed: Mar. 29, 2011

(86) PCT No.: PCT/JP2011/058482
§ 371 (c)(1),
(2), (4) Date: Sep. 27, 2012

(87) PCT Pub. No.: WO2011/125960
PCT Pub. Date: Oct. 13, 2011

(65) Prior Publication Data
US 2013/0022511 A1   Jan. 24, 2013

(30) Foreign Application Priority Data

Apr. 1, 2010   (JP) .................................. 2010-085266

(51) Int. Cl.
*B01J 37/02* (2006.01)
*B01D 53/94* (2006.01)
(Continued)

(52) U.S. Cl.
CPC ........... *B01J 37/0248* (2013.01); *B01D 53/944* (2013.01); *B01D 53/945* (2013.01);
(Continued)

(58) Field of Classification Search
CPC . F01N 3/0814; F01N 3/0842; B01D 53/9427; B01D 53/944; B01D 53/9486; B01J 20/18; B01J 29/7415

USPC .................. 422/177, 180; 55/523; 502/60, 67
See application file for complete search history.

(56) References Cited

U.S. PATENT DOCUMENTS 5,939,028 A    8/1999 Bennett et al.

FOREIGN PATENT DOCUMENTS

EP    0 602 865    6/1994
JP    6-219721    8/1994
(Continued)

OTHER PUBLICATIONS

Extended European Search Report for EP Appl. No. 11765860.9 dated Mar. 22, 2013.

(Continued)

*Primary Examiner* — Tom P Duong
(74) *Attorney, Agent, or Firm* — Finnegan, Henderson, Farabow, Garrett & Dunner, LLP

(57) ABSTRACT

An exhaust purifying apparatus of an internal combustion engine is provided. The exhaust purifying apparatus includes a CO oxidation catalyst disposed in the exhaust flow passage of an internal combustion engine and capable of oxidizing and thereby purifying CO in the exhaust, and an HC adsorbent material loaded with a noble metal, for adsorbing HC in the exhaust. The exhaust purifying apparatus further includes an NOx adsorbent material for adsorbing NOx in the exhaust. These adsorbent materials are located on the upstream side in the exhaust flow direction with respect to the CO oxidation catalyst and disposed in order from the upstream. The CO oxidation catalyst contains Pd and $CeO_2$ and is obtained by an oxidation treatment at a temperature of 850 to 950° C. The amount of Pd supported in the CO oxidation catalyst is from 0.1 to 2.5 mass % based on $CeO_2$.

3 Claims, 4 Drawing Sheets

(51) Int. Cl.
B01J 20/06 (2006.01)
B01J 20/18 (2006.01)
B01J 23/63 (2006.01)
B01J 29/67 (2006.01)
B01J 29/74 (2006.01)
B01J 29/78 (2006.01)
B01J 29/80 (2006.01)
B01J 35/00 (2006.01)
B01J 35/04 (2006.01)
B01J 37/03 (2006.01)
F01N 3/08 (2006.01)
B01J 37/10 (2006.01)
B01J 29/12 (2006.01)
B01J 29/44 (2006.01)
F01N 13/00 (2010.01)
B01J 20/02 (2006.01)
B01J 20/16 (2006.01)

(52) U.S. Cl.
CPC ........ *B01D53/9481* (2013.01); *B01D 53/9486* (2013.01); *B01J 20/0211* (2013.01); *B01J 20/0222* (2013.01); *B01J 20/0233* (2013.01); *B01J 20/06* (2013.01); *B01J 20/165* (2013.01); *B01J 20/18* (2013.01); *B01J 20/186* (2013.01); *B01J 23/63* (2013.01); *B01J 29/126* (2013.01); *B01J 29/44* (2013.01); *B01J 29/67* (2013.01); *B01J 29/7415* (2013.01); *B01J 29/7815* (2013.01); *B01J 29/80* (2013.01); *B01J 35/0006* (2013.01); *B01J 35/04* (2013.01); *B01J 37/0201* (2013.01); *B01J 37/0246* (2013.01); *B01J 37/031* (2013.01); *B01J 37/038* (2013.01); *B01J 37/10* (2013.01); *F01N 3/0807* (2013.01); *F01N 3/0814* (2013.01); *F01N 3/0835* (2013.01); *F01N 3/0842* (2013.01); *F01N 13/0093* (2014.06); *B01D 2255/1023* (2013.01); *B01D 2255/2065* (2013.01); *B01D 2257/404* (2013.01); *B01D 2258/01* (2013.01); *B01J 2229/186* (2013.01); *F01N 2570/10* (2013.01); *Y02T 10/22* (2013.01)

(56) References Cited

FOREIGN PATENT DOCUMENTS

| | | |
|---|---|---|
| JP | 10-180096 | 7/1998 |
| JP | 10-252455 | 9/1998 |
| JP | 2000-199422 | 7/2000 |
| JP | 2005-538301 | 12/2005 |
| JP | 2006-272115 | 10/2006 |
| JP | 2007-160168 | 6/2007 |
| JP | 2009-518162 | 5/2009 |
| JP | 2011-140011 | 7/2011 |
| WO | WO 03056150 A2 * | 7/2003 |

OTHER PUBLICATIONS

"Improvement of Activity of CO Oxidation Catalyst Obtained by Heat Treatment of Pd/CeO$_2$," Proceedings of the 105th Catalyst Discussion Session (Mar. 2010).

* cited by examiner

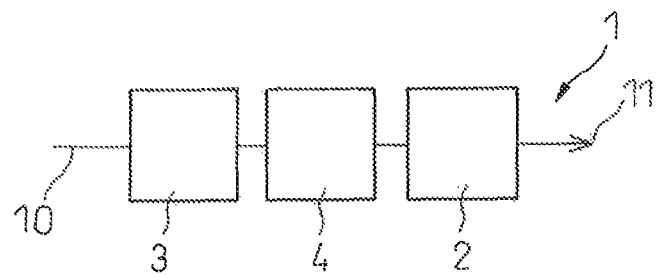
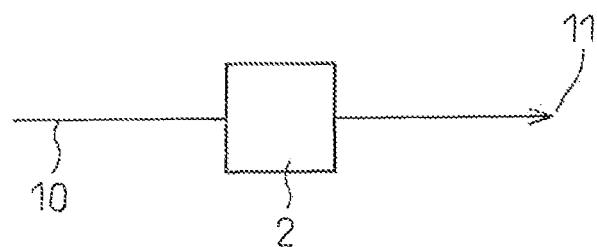
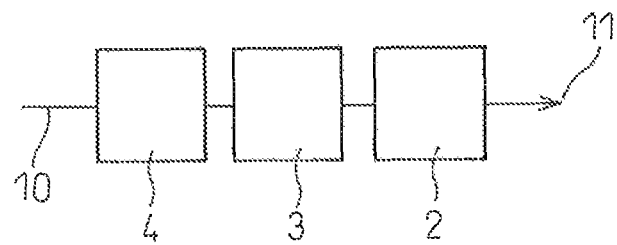

EXHAUST PURIFYING CATALYST

CROSS-REFERENCE TO RELATED APPLICATIONS

This application is a national phase application of International Application No. PCT/JP2011/058482, filed Mar. 29, 2011, and claims the priority of Japanese Application No. 2010-085266, filed Apr. 1, 2010, the content of both of which is incorporated herein by reference.

TECHNICAL FIELD

The present invention relates to an exhaust purifying catalyst. More specifically, the present invention relates to an exhaust purifying catalyst that has a specific structure which enables effective oxidation of CO at a low temperature.

BACKGROUND ART

Recently, exhaust purification is an environmentally important problem and in view of air pollution prevention, regulations have become stricter. In order to remove harmful components from exhaust emitted from an internal combustion engine of automobiles or the like or other combustion engines, use of an exhaust purifying catalyst is being carried out.

For example, the exhaust discharged from an engine is purified by a catalyst converter and then released into the air. However, due to low temperature immediately after initiation of engine operation, the catalyst in the catalyst converter is in an inactive state and cannot sufficiently purify the exhaust.

On the other hand, the catalyst used for exhaust purification is generally a catalyst obtained by loading a noble metal such as Ag, Pt and Pd on a support, but such a noble metal is expensive and in view of resources the amount used thereof must be reduced.

On this account, various studies are being made on catalysts.

For example, Kokai (Japanese Unexamined Patent Publication) No. 2007-160168 describes an exhaust purifying apparatus comprising an HC adsorbent material composed of a zeolite ion-exchanged/loaded with at least either one of Pd and Ag, an $NO_x$ adsorbent material disposed on the exhaust downstream side of the HC adsorbent material and composed of a zeolite ion-exchanged/loaded with at least one member selected from Fe, Cu and Co, and a CO adsorbent material disposed on the exhaust downstream side of the $NO_x$ adsorbent material and obtained by loading Pd on ceria. As specific examples thereof, there is exemplified a case where a model gas consisting of $C_3H_6$ as HC, $NO_2$, CO and $H_2O$, with the balance being $N_2$, is flowed at room temperature (25° C.) for 20 seconds and when the adsorption rate is measured, a high adsorption rate is obtained. However, the CO purification rate in the case of flowing the gas continuously in the co-presence of oxygen is unknown.

RELATED ART

Patent Document

Patent Document 1: Japanese Unexamined Patent Publication (Kokai) No. 2007-160168

SUMMARY OF THE INVENTION

Problems to be Solved by the Invention

In this way, the exhaust purifying apparatus described in the known patent document has not achieved a good CO purification rate over a wide range of temperatures including a temperature of less than 100° C., and an exhaust purifying catalyst capable of efficiently purifying CO at a low temperature is required.

To meet this requirement, the present inventors have filed a patent application (Japanese Patent Application No. 2010-003221) for a CO oxidation catalyst capable of exhibiting CO oxidation activity over a wide range of temperatures including a low temperature. However, it has been revealed that even the exhaust purifying apparatus of an internal combustion engine according to the invention of the patent application above, in which the CO oxidation catalyst contains Pd and $CeO_2$ and the amount of Pd supported is from 0.01 to 5.0 mass % based on $CeO_2$, is insufficient in the CO purifying performance when applied to an exhaust close to the actual composition.

Accordingly, an object of the present invention is to provide an exhaust purifying catalyst capable of efficiently purifying CO over a wide range of temperatures including a low temperature.

Means to Solve the Problems

The present invention relates to an exhaust purifying apparatus of an internal combustion engine, comprising a CO oxidation catalyst disposed in the exhaust flow passage of an internal combustion engine and capable of oxidizing and thereby purifying CO, an HC adsorbent material for adsorbing HC in the exhaust, and an $NO_x$ adsorbent material for adsorbing $NO_x$ in the exhaust, these adsorbent materials being located on the upstream side in the exhaust flow direction with respect to the CO oxidation catalyst and disposed in order from the upstream, wherein the CO oxidation catalyst contains Pd and $CeO_2$ and the amount of Pd supported is from 0.01 to 5.0 mass % based on $CeO_2$.

In the description of the present invention, "over a wide range of temperatures including a low temperature" indicates a temperature ranging from 50 to 300° C. Also, "capable of efficiently purifying CO" as used in the present invention means that the catalyst can exhibit a CO purification rate equal to or greater than those of conventionally known CO oxidation catalysts.

Effects of the Invention

According to the present invention, an exhaust purifying catalyst capable of efficiently purifying CO over a wide range of temperatures including a low temperature can be obtained.

BRIEF DESCRIPTION OF THE DRAWINGS

FIG. 1 is a schematic view of the exhaust purifying catalyst according to one embodiment of the present invention.

FIG. 2 is a schematic view of an exhaust purifying catalyst out of the scope of the present invention.

FIG. 3 is a schematic view of another exhaust purifying catalyst out of the scope of the present invention.

MODE FOR CARRYING OUT THE INVENTION

Figure 4:
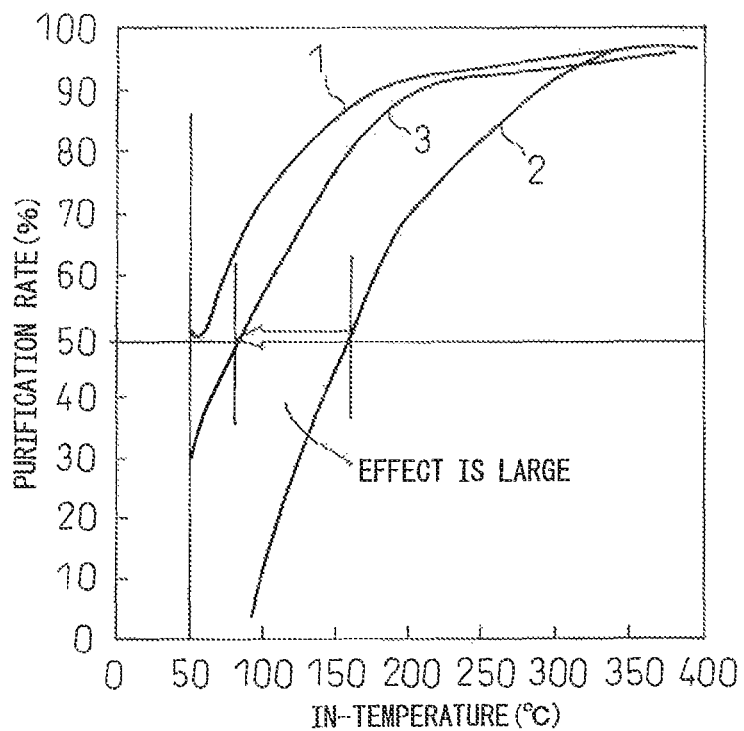
FIG. 4 is a graph showing the performance of the exhaust purifying catalyst according to one embodiment of the present invention.

In the present invention, the exhaust purifying apparatus must be an exhaust purifying apparatus using, as a CO oxidation catalyst disposed in the exhaust flow passage of an internal combustion engine and capable of oxidizing and thereby purifying CO in the exhaust, a catalyst containing Pd and $CeO_2$, in which the amount of Pd supported is from 0.01 to 5.0 mass %, preferably from 0.1 to 2.5 mass %, based on $CeO_2$, and comprising, on the upstream side in the exhaust flow direction with respect to the CO oxidation catalyst, in order from the upstream side, an HC adsorbent material for adsorbing HC in the exhaust and, at a position downstream thereof but upstream of the CO oxidation catalyst, an $NO_x$ adsorbent material for adsorbing $NO_x$ in the exhaust, and thanks to this configuration, sufficient CO purifying performance can be obtained when applied to an exhaust close to the actual exhaust composition.

The present invention is described below by referring to FIGS. 1 to 8.

As shown in FIG. 1, the exhaust purifying apparatus 1 of an internal combustion engine of the present invention comprises a CO oxidation catalyst 2 containing Pd and $CeO_2$ and being disposed in the exhaust flow passage 10 of an internal combustion engine and capable of oxidizing and thereby purifying CO in the exhaust, in which the amount of Pd supported is from 0.01 to 5.0 mass % based on $CeO_2$, an HC adsorbent material 3 for adsorbing HC in the exhaust, and an $NO_x$ adsorbent material 4 for adsorbing $NO_x$ in the exhaust, these adsorbent materials being located on the upstream side in the exhaust flow direction 11 with respect to the CO oxidation catalyst 2 and disposed in order from the upstream side.

It is confirmed from FIG. 4 that an exhaust purifying apparatus shown in FIG. 2 comprising only the above-described CO oxidation catalyst exhibits, as indicated by curve 1, a high CO purification rate over a wide range of temperatures including a low temperature of less than 100° C. when the exhaust composition is a model gas composition containing CO, $O_2$ and $N_2$ but, as indicated by curve 2, is greatly reduced in the CO purification rate at 100° C. or less when the exhaust composition is a coexisting system simulating the actual exhaust containing CO, $O_2$, $N_2$, HC, $H_2O$ and $N_2$, whereas, as indicated by curve 3, according to the exhaust purifying apparatus in an embodiment of the present invention, a high CO purification rate can be exhibited even in the coexisting system above over a wide range of temperatures including a low temperature of less than 100° C.

Figure 5:
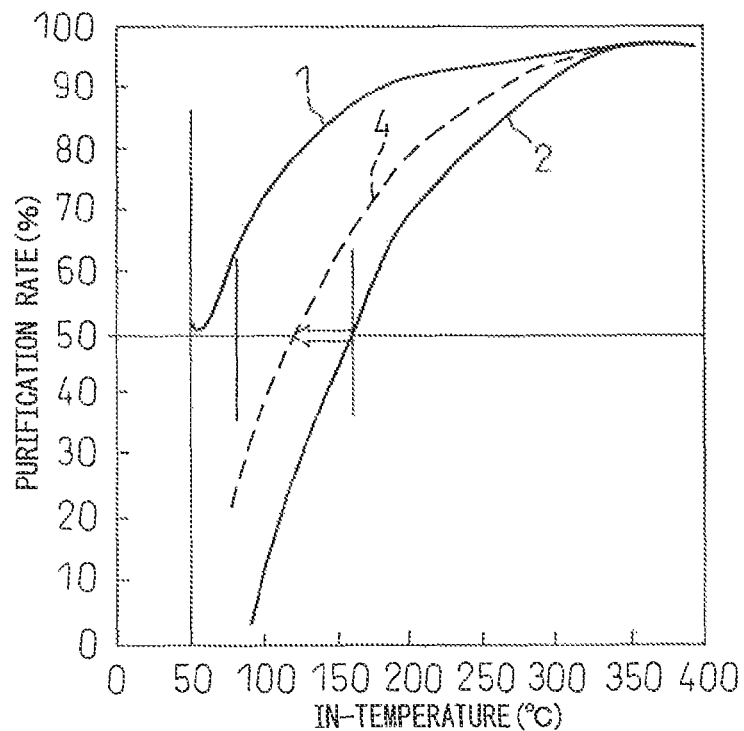
FIG. 5 is a graph showing the performance of an exhaust purifying catalyst out of the scope of the present invention.

However, despite use of the CO oxidation catalyst above, according to an exhaust purifying apparatus shown in FIG. 3 where the positions of the HC adsorbent material and $NO_x$ adsorbent material are changed, as indicated by curve 4 in FIG. 5, the CO purification rate at 100° C. or less remains greatly low in a coexisting system with an exhaust composition simulating the actual exhaust containing CO, $O_2$, $N_2$, HC, $H_2O$ and $N_2$.

As understood from FIGS. 4 and 5, in the exhaust purifying apparatus of the present invention, it is necessary to use the CO oxidation catalyst above and dispose an HC adsorbent material on the upstream side in the exhaust flow direction with respect to the CO oxidation catalyst and an $NO_x$ adsorbent material at a position upstream of the CO oxidation catalyst but downstream of the HC adsorbent material.

Figure 6:
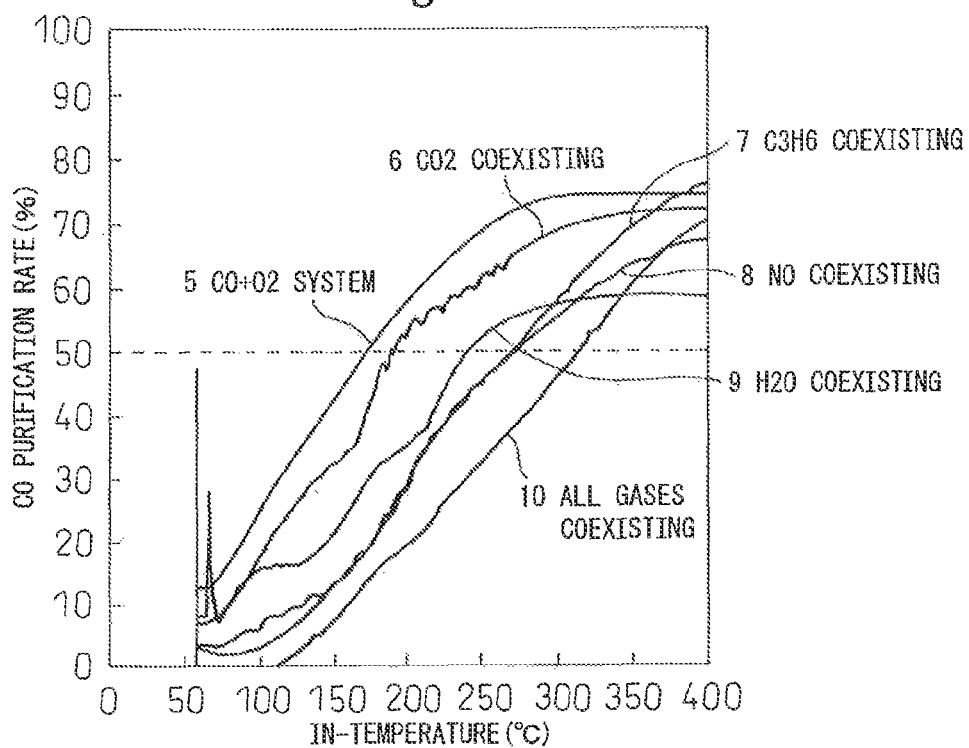
FIG. 6 is a graph showing the effect, of the exhaust composition on the CO purifying performance of the CO oxidation catalyst for use in the present invention.

In the CO oxidation catalyst for use in the present invention, as shown in. FIG. 6, the CO purification rate is greatly affected by the gas composition, and it is understood that the $CO+O_2$ system of curve 5 has a very little effect and the effect is increased in the following order: $CO+O_2+CO_2$ system (abbreviated to $CO_2$ coexisting system), $CO+O_2+C_3H_6$ system (abbreviated to $C_3H_6$ coexisting system), $CO+O_2+NO$ system (abbreviated to NO coexisting system), $CO+O_2+H_2O$ system (abbreviated to $H_2O$ coexisting system), and $CO+O_2+CO_2+C_3H_6+NO+H_2O$ system (abbreviated to all components coexisting system), while bigger the effect by the gas composition, the lower CO purification rate of the CO oxidation catalyst.

Figure 7:
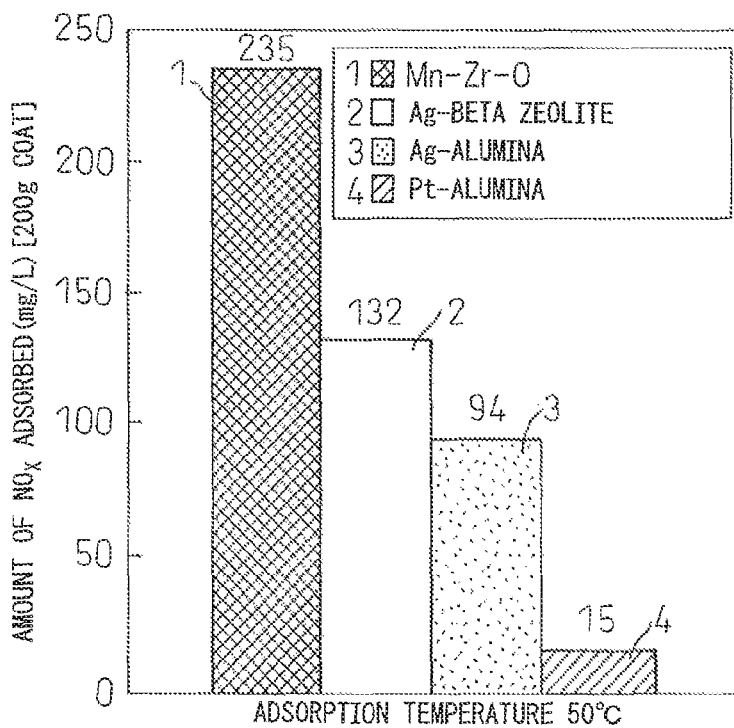
FIG. 7 is a graph comparing the $NO_x$ adsorption performances of various $NO_x$ adsorbent materials in a specific gas composition.
Figure 8:
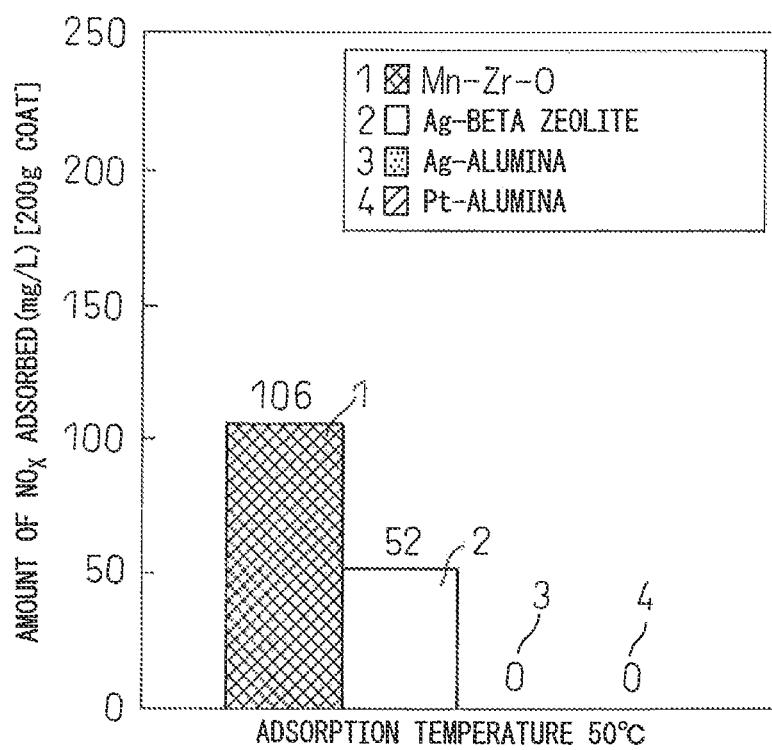
FIG. 8 is a graph comparing the $NO_x$ adsorption performances of various $NO_x$ adsorbent materials in another gas composition.

In the $NO_x$ adsorbent material used in the present invention, as shown in FIGS. 7 and 8, at a low temperature of 50° C., the amount of $NO_x$ adsorbed is affected by the type of the adsorbent material-constituting substance and the gas composition, and it is understood that: the amount of $NO_x$ adsorbed for the $NO_x$ adsorbent material of Mn—Zr—O, which is indicated by bar 1, is 235 mg/L in the $H_2O+CO_2$ system, but is decreased to 106 mg/L in the $C_3H_6+H_2O+CO_2$ system; the amount of $NO_x$ adsorbed for the NC % adsorbent material of Ag/β zeolite, which is indicated by bar 2, is 132 mg/L in the $H_2O+CO_2$ system, but is decreased to 52 mg/L in the $C_3H_6+H_2O+CO_2$ system; the amount of $NO_x$ adsorbed for the $NO_x$ adsorbent material of Ag/alumina, which is indicated by bar 3, is 94 mg/L in the $H_2O+CO_2$ system, but is decreased to 0 mg/L in the $C_3H_6+H_2O+CO_2$ system, and the amount of $NO_x$ adsorbed for the $NO_x$ adsorbent material of Pt/alumina, which is indicated by bar 4, is 15 mg/L in the $H_2O+CO_2$ system, but is decreased to 0 mg/L in the $C_3H_6+H_2O+CO_2$ system.

As understood from FIGS. 7 and 8, the $NO_x$ adsorbent material used in the present invention, is an $NO_x$ adsorbent material comprised of Mn—Zr—O or an $NO_x$ adsorbent material comprised of Ag/β zeolite.

The CO oxidation catalyst used in the present invention can be obtained by loading a Pd salt onto a $CeO_2$ support particle at so that a ratio of the amount of Pd supported is from 0.01 to 5.0 mass % $Pd/CeO_2$, particularly from 0.1 to 2.5 mass % $Pd/CeO_2$, and heat-treating the particle in an oxidative atmosphere, in particular at a temperature of 850 to 950° C.

In loading the Pd salt onto the $CeO_2$ support particle, for example, Pd salt can be loaded onto the $CeO_2$ support particle using impregnating and loading method by using a $CeO_2$ support particle produced by a known method and a Pd salt which is able to give Pd.

Also, the $CeO_2$ support can be obtained by separating and collecting the precipitate from an aqueous solution of a $CeO_2$ precursor, for example, a Ce hydroxide or Ce salt hydrate which is able to give the oxide, and heat treating it at a temperature of 300 to 500° C.

The oxidative atmosphere is an air or a gas atmosphere containing from 1 to 25% of $O_2$, and the heat treatment time is, for example, from 2 to 100 hours.

As the Pd salt, a chloride, a nitrate, a sulfate, a sulfonate, a phosphate or an ammine complex (salt), preferably a chloride, a nitrate or an ammine salt, of Pd is used, and the particle diameter of the Pd particle decreases approximately in order of (large) chloride>nitrate>ammine salt (small). Accordingly, a salt suitable for the desired particle diameter of the Pd particle can be selected.

The Pd salt is used in the form of an aqueous solution, and the aqueous solution can be an aqueous Pd salt solution having a Pd concentration from $1\times10^{-4}$ to $1\times10^{-3}$ mol/L.

The CO oxidation catalyst of the heat-treated $CeO_2$-supported Pd can be used by coating the CO oxidation catalyst of the $CeO_2$-supported Pd onto a substrate to form a CO oxidation catalyst layer.

The CO oxidation catalyst layer can be formed on a catalyst substrate by obtaining a coating slurry from powdered $CeO_2$-supported Pd and water, charging the slurry in a substrate, for example, a honeycomb substrate, coating it by drawing the lower part, and drying and firing the coating. The amount of the CO oxidation catalyst layer coated can be controlled by adjusting the viscosity or solid content of the slurry or the amount of the slurry charged. The amount of the CO oxidation catalyst layer coated is 300 g/L or more.

The CO oxidation catalyst used in the present invention has a CO oxidation activity by oxidizing CO and converting it into harmless $CO_2$ over a wide range of temperature including a low temperature.

As the $NO_x$ adsorbent material used in the present invention, having basicity such as $ZrO_2$, β zeolite, spinel, $MgAl_2O_4$ and $Al_2O_3$, and having both acidity and basicity and being capable of adsorbing $NO_x$ under low temperature conditions and desorbing $NO_x$ under high temperature conditions, can be used. For example, $ZrO_2$ has properties of adsorbing $NO_x$ under room temperature to 350° C. and desorbing $NO_x$ from 350 to 400° C.

Also, at least one of La, K and Ca may be added to the $NO_x$ adsorbent material.

As for the $NO_x$ adsorbent material, one of an oxide of an alkali metal, an oxide of an alkaline earth metal, an oxide of a rare earth element, a transition metal oxide such as $Co_3O_4$, $NiO_2$, $MnO_2$, $Fe_2O_3$ and $ZrO_2$, and the like may be used alone, or a plurality thereof may be used in combination as the $NO_x$ adsorbent material. In addition, the material obtained by loading a metal element selected from an alkali metal, an alkaline earth metal and a rare earth element, on a porous oxide support such as alumina, silica, silica-alumina, zirconia, titania and zeolite, may be also used as the $NO_x$ adsorbent material.

In particular, when a porous oxide ion-exchanged/loaded with an alkali metal, an alkaline earth metal or a rare earth element is used as the $NO_x$ adsorbent material, the temperature at which the adsorbed $NO_x$ is released becomes low, and adsorption/release of $NO_x$ can be repeated even at an exhaust temperature in low-to-medium temperature region. Furthermore, the material obtained by adding an alkali metal or an alkaline earth metal to $ZrO_2$ also exhibit excellent $NO_x$ adsorbability.

In addition, when such an adsorbent material is further loaded with a noble metal such as Ag, Pt, Rh and Pd or a transition metal oxide such as $Co_3O_4$, $Ni_2$, $MnO_2$ and $Fe_2O_3$ the $NO_x$ adsorbability is more enhanced. This is considered to be a result of oxidation activity being brought out by the noble metal, $CO_3O_4$, $NiO_2$, $Fe_2O_3$ or the like and NO in the exhaust is oxidized into $NO_2$, leading to an increase in the amount of $NO_x$ adsorbed.

The zeolite above has pores of a size comparable to molecular size, contains a cation for neutralizing the negative charge of $Al_2O_3$ as the main component, and can be ion-exchanged/loaded with at least one metal element selected from an alkali metal, an alkaline earth metal and a rare earth element, and the ion-exchanged/loaded metal element which is loaded onto the zeolite to achieve very high dispersion and therefore, is highly active and in turn, the NO oxidation activity in the low temperature region is enhanced.

As the zeolite, for example, a zeolite such as β zeolite, ferrielite, ZSM-5, mordenite and Y-type zeolite can be used.

Above all, in the present invention, the $NO_x$ adsorbent material is an $NO_x$ adsorbent material comprised of Mn—Zr—O or an Ag/β zeolite.

Also, the NC adsorbent material used in the present invention may be any one of mordenite, ZSM-5, Y-type zeolite, ferrielite or β zeolite.

The HC adsorbent material will be loaded with a noble metal, for example, Ag, Pt, Rh and Pd.

By virtue of having the above-described configuration, the exhaust purifying catalyst of the present invention can efficiently purify CO over a wide range of temperatures including a low temperature. However, as long as the effects above are not reduced, a member having other arbitrary functions, which is applicable to an exhaust purifying catalyst of an internal combustion engine, can be added and, for example, a particulate filter (DPF) capable of trapping a particulate substance in the exhaust may be added at an arbitrary position.

The exhaust purifying catalyst of the present invention can be applied to all internal combustion engines which may generate CO during operation at a low temperature, including an automobile engine.

EXAMPLES

Working examples of the present invention are described below.

The following Examples are explanatory only and are not restrictive of the present invention.

In each Example below, the CO purification rate of the exhaust purifying catalyst was measured by the following apparatus.
1. Apparatus: Model as evaluation apparatus
2. Measurement conditions
    Model gas composition (vol %):
    1) CO: 800 ppm, $O_2$: 10%, $N_2$: balance
    2) CO: 800 ppm, $O_2$: 10%, HC ($C_3H_6$): 400 ppm, NO: 100 ppm, $H_2O$: 3%, $CO_2$: 10%, $N_2$: balance
    Gas flow rate: 10 mL/min The following CO oxidation catalyst, HC adsorbent material and N % adsorbent material used in each of Examples were used.
1) CO Oxidation Catalyst
    Pd was loaded on $CeO_2$ (produced by Rhodia, specific surface area: 157 $m^2/g$) by an impregnation loading method using $Pd(NO_3)_2$. The amount of Pd supported was 0.4 mass % $Pd/CeO_2$. This was fired in air at 600° C. for 3 hours and further heat-treated in 10% $H_2O$/air at 900° C. for 25 hours to obtain a CO oxidation catalyst.
2) HC Adsorbent. Material
    Ag/ferrielite (amount of Ag supported: 11 mass %) obtained by loading Ag on ferrielite (produced by Tosoh Corporation) in a usual manner was used.
3) $NO_x$ Adsorbent Material
    Mn—Zr—O (compositional ratio: 1:1:2) (prepared from Mn nitrate and Zn nitrate by a coprecipitation method) or Ag/β zeolite (amount of Ag supported: 11 mass %) prepared by loading Ag onto β zeolite (produced by Tosoh Corporation) was used.

Example 1

An exhaust purifying catalyst was produced by placing the above-described CO oxidation catalyst. HC adsorbent material and NO$_x$ adsorbent material in the apparatus for measuring the CO purification rate to give a configuration shown in the schematic view of FIG. 1.

Using this exhaust purifying catalyst, with respect to the model gas composition 2) above, the CO purification rate (%) at each temperature was measured by raising the temperature at a constant rate to a temperature of 50 to 350° C. or more (temperature rise rate: 20° C./min).

The results obtained are shown by curve 3 together with other results in FIG. 4.

Comparative Example 1

An exhaust purifying catalyst was produced by placing the above-described CO oxidation catalyst in the apparatus for measuring the CO purification rate to give a configuration shown in the schematic view of FIG. 2.

Using this exhaust purifying catalyst, with respect to the model gas composition 1) above, the CO purification rate (%) at each temperature was measured by raising the temperature at a constant rate to a temperature of 50 to 350° C. or more (temperature rise rate: 20° C./min). The results obtained are shown by curve 1 together with other results in FIGS. 4 and 5.

Also, using this exhaust purifying catalyst, with respect to the model gas composition 2) above, the CO purification rate (%) at each temperature was measured by raising the temperature at a constant rate to a temperature of 50 to 350° C. or more (temperature rise rate: 20° C./min). The results obtained are shown by curve 2 together with other results in FIGS. 4 and 5.

Comparative Example 2

An exhaust purifying catalyst was produced by placing the above-described CO oxidation catalyst, HC adsorbent material and NO$_x$ adsorbent material in the apparatus for measuring the CO purification rate which resulted in a configuration shown in the schematic view of FIG. 3.

Using this exhaust purifying catalyst, with respect to the model gas composition 2) above, the CO purification rate (%) at each temperature was measured by raising the temperature at a constant rate to a temperature of 50 to 350° C. or more (temperature rise rate: 20° C./min).

The results obtained are shown by curve 4 together with other results in FIG. 5.

Reference Example 1

An exhaust purifying catalyst was produced by placing the above-described CO oxidation catalyst in the apparatus for measuring the CO purification rate which resulted in a configuration shown in the schematic view of FIG. 2.

Using this exhaust purifying catalyst, with respect to various model gas compositions shown below, the CO purification rate (%) at each temperature was measured by raising the temperature at a constant rate to a temperature of 50 to 350° C. or more (temperature rise rate: 20° C./min).

Model gas composition (vol %):
5) CO: 800 ppm, O$_2$: 10%
6) CO: 800 ppm, O$_2$: 10%, CO$_2$: 10%
7) CO: 800 ppm, O$_2$: 10%, C$_3$H$_6$: 400 ppm
8) CO: 800 ppm, O$_2$: 10%, NO: 100 ppm
9) CO: 800 ppm, O$_2$: 10%, H$_2$O; 3%
10) CO; 800 ppm, O$_2$: 10%, CO$_2$: 10%, C$_3$H$_5$: 400 ppm, NO: 100 ppm, H$_2$O: 3%

Gas flow rate: 10 l/min

The results obtained are shown by curves 5 to 10 (the curve number corresponds to the gas composition number) in FIG. 6.

Reference Example 2

Using each of the following NO adsorbent materials, the amount of NO$_x$ adsorbed (mg/l liter, 200 g coat) at an adsorption temperature of 50° C. was measured by supplying each gas having two kinds of model gas compositions, i.e., H$_2$O and CO$_2$ coexisting system (compositional ratio=3:10) and C$_3$H$_6$, H$_2$O and CO$_2$ coexisting system (compositional ratio=4:300:1000):

Mn—Zr—O (compositional ratio: 1:1:2) (prepared by a coprecipitation method from Mn nitrate and Zn nitrate),
Ag/β zeolite (amount of Ag supported: 11 mass %),
Ag/alumina (amount of Ag supported: 11 mass %), and
Pt/alumina (amount of Pt supported: 2 mass %).

FIGS. 7 and 8 show the measurement results.

As apparent from the results in FIG. 4 and FIGS. 7 and 8, in the present invention, the arrangement of CO oxidation catalyst, HC adsorbent material and NO$_x$ adsorbent material shown in FIG. 1 must be configured, and it is preferable to combine the configuration above with Mn—Zr—O or Ag/β zeolite as the NO$_x$ adsorbent material.

INDUSTRIAL APPLICABILITY

According to the present invention, CO can be efficiently purified over a wide range of temperatures including a low temperature, and therefore, CO can be efficiently removed from the exhaust of an internal combustion engine.

The invention claimed is:

1. An exhaust purifying apparatus of an internal combustion engine, comprising:
   a CO oxidation catalyst disposed in the exhaust flow passage of an internal combustion engine and capable of oxidizing and thereby purifying CO in the exhaust;
   an HC adsorbent material loaded with a noble metal, for adsorbing HC in the exhaust; and
   an NO$_x$ adsorbent material for adsorbing NO$_x$ in the exhaust, these adsorbent materials being located on the upstream side in the exhaust flow direction with respect to said CO oxidation catalyst and disposed in order from the upstream, wherein said CO oxidation catalyst contains Pd and CeO$_2$ and is obtained by an oxidation treatment at a temperature of 850 to 950° C. and the amount of Pd supported in said CO oxidation catalyst is from 0.1 to 2.5 mass % based on CeO$_2$.

2. The exhaust purifying apparatus as claimed in claim 1, wherein said NO$_x$ adsorbent material is an NO$_x$ adsorbent material of Mn—Zr—O or an Ag/β zeolite.

3. The exhaust purifying apparatus as claimed in claim 1, wherein said HC adsorbent material contains any one of mordenite, ZSM-5, Y-type zeolite, ferrielite and β zeolite.

* * * * *